United States Patent
Hager et al.

(10) Patent No.: US 8,486,527 B2
(45) Date of Patent: Jul. 16, 2013

(54) COMPACT, HYBRID FIBER REINFORCED RODS FOR OPTICAL CABLE REINFORCEMENTS AND METHOD FOR MAKING SAME

(75) Inventors: Thomas P. Hager, Westerville, OH (US); Richard N. Lehman, Newark, OH (US)

(73) Assignee: Neptco JV LLC, Pawtucket, RI (US)

( * ) Notice: Subject to any disclaimer, the term of this patent is extended or adjusted under 35 U.S.C. 154(b) by 0 days.

(21) Appl. No.: 10/003,529

(22) Filed: Oct. 31, 2001

(65) Prior Publication Data
US 2003/0082380 A1 May 1, 2003

(51) Int. Cl.
*D02G 3/00* (2006.01)

(52) U.S. Cl.
USPC ............ 428/378; 428/375; 428/377; 428/392

(58) Field of Classification Search
USPC ................... 428/372, 375, 378, 392
See application file for complete search history.

(56) References Cited

U.S. PATENT DOCUMENTS

| | | | |
|---|---|---|---|
| 4,479,984 A | 10/1984 | Levy et al. | |
| 4,629,286 A * | 12/1986 | Fuse et al. | 385/128 |
| 4,956,039 A | 9/1990 | Olesen et al. | |
| 5,109,457 A * | 4/1992 | Panuska et al. | 385/102 |
| 5,126,167 A * | 6/1992 | Matsuno et al. | 427/163.2 |
| 5,201,020 A * | 4/1993 | Kannabiran | 385/113 |
| RE34,516 E * | 1/1994 | Houghton | 385/103 |
| 5,390,273 A | 2/1995 | Rahman et al. | |
| 5,480,706 A | 1/1996 | Li et al. | |
| 5,700,417 A * | 12/1997 | Fernyhough et al. | 264/477 |
| 5,908,689 A | 6/1999 | Dana et al. | |
| 6,004,676 A | 12/1999 | Girgis | |
| 6,037,056 A | 3/2000 | Macdonald et al. | |
| 6,047,094 A * | 4/2000 | Kalamkarov et al. | 385/12 |
| 6,055,351 A | 4/2000 | Yang et al. | |
| 6,103,317 A * | 8/2000 | Asai et al. | 427/512 |
| 6,198,865 B1 * | 3/2001 | Risch | 385/113 |
| 6,238,791 B1 | 5/2001 | Schell et al. | |
| 6,249,629 B1 * | 6/2001 | Bringuier | 385/113 |
| 6,265,333 B1 | 7/2001 | Dzenis et al. | |
| 6,400,873 B1 * | 6/2002 | Gimblet et al. | 385/102 |
| 6,486,465 B1 * | 11/2002 | Hein | 250/227.14 |
| 6,496,628 B1 * | 12/2002 | Opel et al. | 385/110 |
| 6,611,646 B1 * | 8/2003 | Norris et al. | 385/113 |
| 6,640,033 B2 * | 10/2003 | Auvray et al. | 385/109 |
| 2003/0082380 A1 * | 5/2003 | Hager et al. | 428/375 |

FOREIGN PATENT DOCUMENTS

| | | | |
|---|---|---|---|
| EP | 291023 A2 * | 11/1988 | |
| EP | 0564130 | 10/1993 | |
| EP | 1037082 | 9/2000 | |
| EP | 1076253 A2 * | 2/2001 | |
| WO | WO 0192433 A1 * | 12/2001 | |

* cited by examiner

*Primary Examiner* — Jill Gray
(74) *Attorney, Agent, or Firm* — Mintz Levin Cohn Ferris Glovsky and Popeo, P.C.

(57) ABSTRACT

Fiber reinforcement rods having a combination of reinforcing fiber members coated with a UV curable vinyl ester resin material and a polybutylene terephthalate/polyether glycol or ethylene acrylic acid topcoat layer. The reinforcing fiber members may be S-type fiber members, E-type glass fiber members, a combination thereof, or E-type glass fiber members and/or S-type glass fiber members with high strength synthetic strands of poly (p-phenylene 2,6 benzoisoxazole fiber members. The topcoat layer provides enhanced properties of specific adhesion, enhanced environmental protection, resistance to surface fiber breakage, and to some degree resistance from delamination.

4 Claims, 4 Drawing Sheets

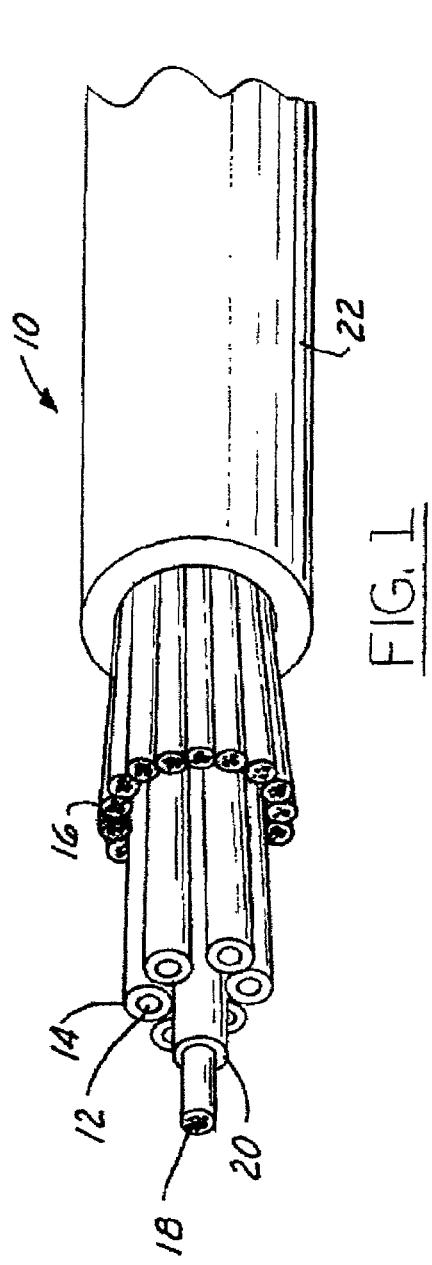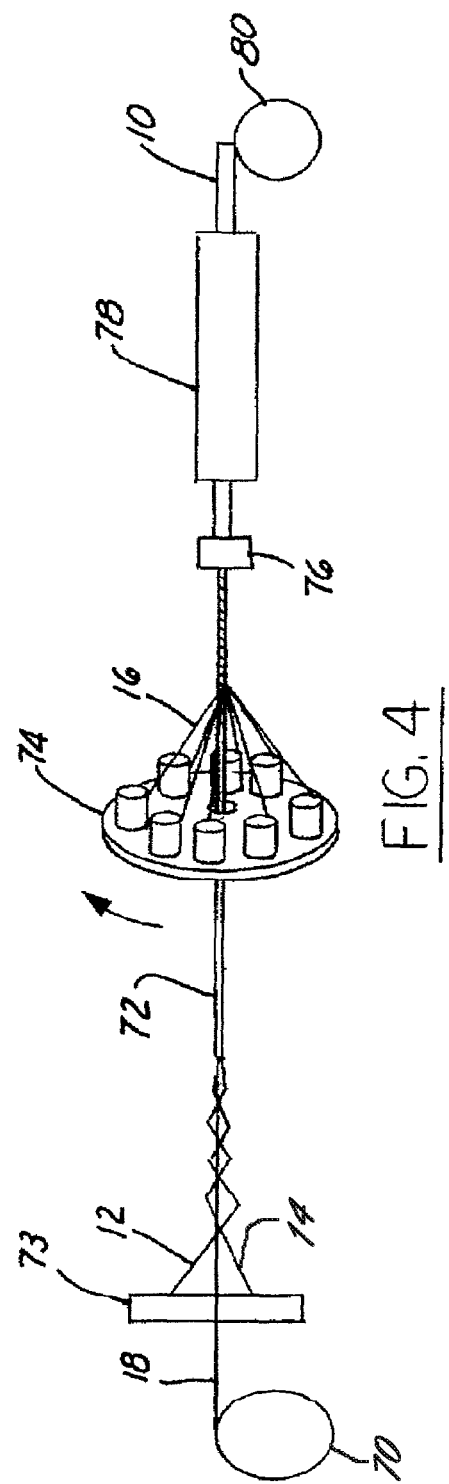

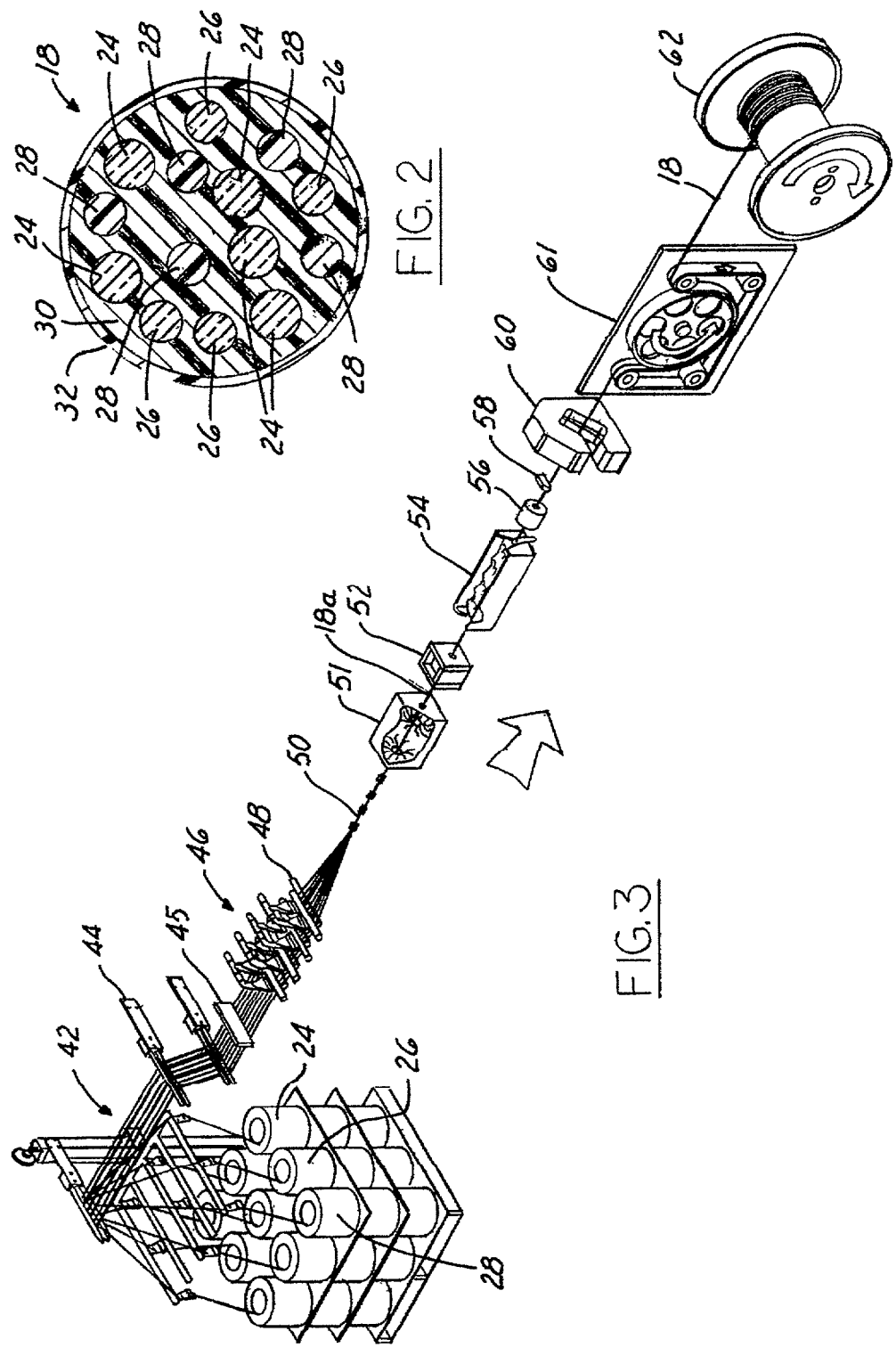

COMPACT, HYBRID FIBER REINFORCED RODS FOR OPTICAL CABLE REINFORCEMENTS AND METHOD FOR MAKING SAME

TECHNICAL FIELD AND INDUSTRIAL APPLICABILITY OF THE INVENTION

The present invention relates generally to optical cables and more specifically to compact, hybrid fiber reinforced rods for optical cable reinforcements.

BACKGROUND OF THE INVENTION

Fiberoptic cables are commonly used to provide electronic communication in a wide variety of indoor and outdoor communication systems. Optical fiber transmission cables generally comprise one or more optical transmission fibers provided with one or more sheathings of synthetic resin material. In addition, in order to provide the required mechanical strength, such cables are also provided with so-called strength members as reinforcement.

Optical fiber transmission cables are inevitably subjected to tensile loads during the manufacture, handling, installation, and, in some cases, the service life of the cables. For example, the cables are sometimes subjected to substantial pulling forces when being installed from towers or in ducts. Further, strung cables are subject to tensile loads as a result of the cables themselves and due to atmospheric conditions such as wind and ice. Therefore, optical fiber transmission cables are provided with reinforcements to take up such loads in order to prevent breakage of the relatively weak optical fibers.

These reinforcements can take on many forms. For example metallic reinforcements such as aluminum or steel or non-metallic reinforcements such as S-glass fibers, aramid fibers (KEVLAR®), XPE, and/or carbon fibers have all been used as reinforcements as is known in the art. Typically, in the case of non-metallic reinforcements, a curable resin coating is applied to the reinforcement fibers to prevent shrinkage and to prevent optical fiber attenuation within the cabling.

While these reinforcements have improved the workable life of a fiberoptic cable, it is desirable to further improve the resin system and/or the fiber composition to improve tensile strength, tensile moduli, adhesion, environmental protection, resistance to surface fiber breakage, and delamination. It is also desirable to improve the processing to permit higher translation of strain energy due to reduced defects and residual stresses to allow tougher more resilient cured composite reinforcement rods. It is also desirable to reduce waste and increase line efficiency during manufacture to reduce costs.

SUMMARY OF THE INVENTION

It is thus an object of the present invention to provide a fiber optic cable reinforcement rod that is capable of having a wide variety of tensile strengths and moduli. By varying the types of fibers and thickness of the UV coating or topcoat layer, a fiber optic cable reinforcement rod member that is capable of having a wide variety of tensile strengths and moduli is realized.

It is also an object of the present invention to provide an improved process for making a fiberoptic cable reinforcement rod that permits high translation of strain energy due to reduced defects and residual stresses to allow a tougher and more resilient cured composite rod.

The above objects are accomplished by providing a fiberoptic cable reinforcement rod comprised of a combination of fibers coated with an UV curable vinyl ester resin matrix and a thermoplastic topcoat. The fibers used include either S-type or E-type glass fibers or a combination of S-type and E-type glass fibers. Alternatively, a high strength synthetic strand of poly(p-phenylene 2,6 benzoisoxazole) may also be introduced in addition to the S-type and E-type glass fibers. Additionally, high strength aramid strands of poly(p-phenylene terephthalate) strands may also be included. The resin matrix can be a UV curable thermosetting resin, a high melting point thermoplastic resin, a thermally curable thermosetting resin, or a combination of the above. The fiber reinforcement rod is then topcoated with a thermoplastic hot melt resin such as a polybutylene terephthalate/polyether glycol copolymer topcoat. The topcoat provides enhanced properties of specific adhesion, enhanced environmental protection, resistance to surface fiber breakage, and to some degree resistance from delamination. The topcoating also permits improved productivity by allowing faster line speeds with reduced waste output, both of which significantly reduce manufacturing costs.

Other objects and advantages of the present invention will become apparent upon considering the following detailed description and appended claims, and upon reference to the accompanying drawings.

BRIEF DESCRIPTION OF THE DRAWINGS

FIG. 1 is a perspective view of a optical fiber cable according to a preferred embodiment of the present invention;

FIG. 2 is a section view of the reinforcement fiber rods of FIG. 1;

FIG. 3 is a schematic diagram for forming the reinforcement fiber rods of FIG. 2;

FIG. 4 is a schematic diagram for forming the fiberoptic cable of FIG. 1;

DETAILED DESCRIPTION AND PREFERRED EMBODIMENTS OF THE INVENTION

Figures 5, 6, 7:
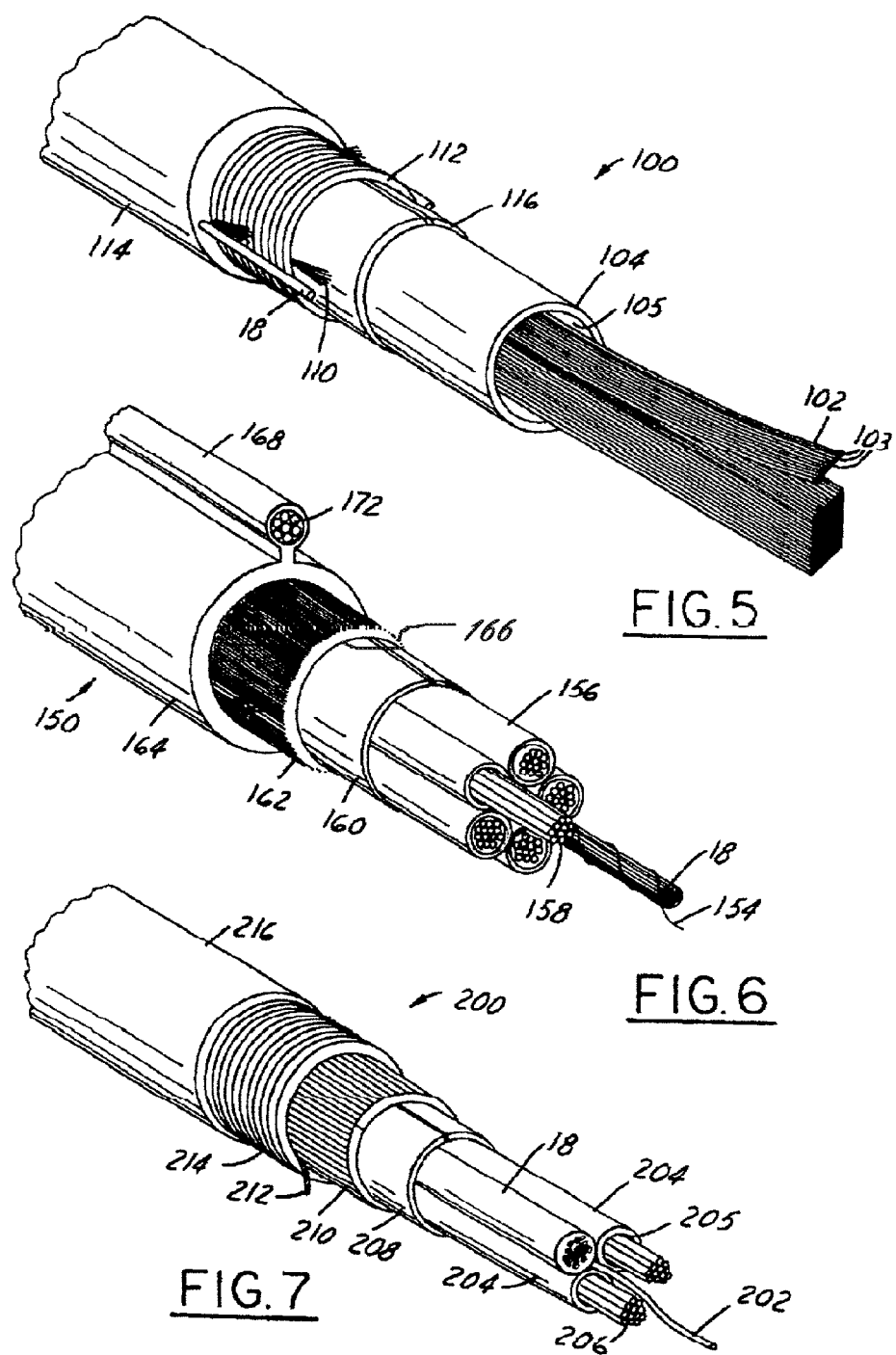
FIG. 5 is a perspective view of an alternative embodiment of the present invention.
FIG. 6 is a perspective view of another alternative embodiment of the present invention.
FIG. 7 is a perspective view of another alternative embodiment of the present invention.

Referring now to FIG. 1, an optical fiber cable 10 is shown according to one preferred embodiment of the present invention as having a plurality of optical fiber members 12 and a plurality of flexible reinforcement fiber members 16 surrounding a central strength member, or fiber reinforcement rod 18, contained within a polymer jacket 22.

The optical fiber members 12 are comprised of long, thin flexible fibers made of glass, plastic, or other transparent material that are well known in the art. Preferably, the optical fiber members 12 are made of fused silica and are used as a pathway to transmit informational signals in the form of light. The optical fiber members 12 preferably are coated with a layer of acrylic coating or similar protective resin. For loose tube optical cable fibers 12, polybutylene terephthalate (PBT) or polypropylene (PP) is extruded around a single or multiple optical fiber member 12 to form a buffer tube 14. A silicone water blocking gel is entrained during the extrusion to flood the inner space of each buffer tube 14.

Alternatively, optical fibers can also be coated with a relatively thick layer of PBT or polyethylene terephthalate (PET) to form a tight-buffered optical fiber. These tight-buffered fibers can be used without the need for an extruded buffer tube 14.

The polymer jacket 22 is similarly well known in the art, and may be comprised of a wide variety of polymers that are both water and fire resistant. Preferably, the jacket 22 is formed of a thin layer of polyethylene (PE). In alternative embodiments, the jacket 22 may be formed of a layer of polyethylene having a non-halogenated fire retardant such as a metal hydrate. One example of a metal hydrate that may be used is alumina trihydrate. If halogens are not an issue, the jacket 22 may also be comprised of polyvinyl chloride (PVC) or fluoropolymers such as fluorinated ethylene propylene (FEP).

The flexible fiber members 16 have many important functions. First, the flexible reinforcement fiber members 16 provide some tensile strength during the installation process. Second, the flexible reinforcement fiber members 16 act as a cushion and space filler to protect and suspend the loose optical fiber members 12 within the polymer jacket 22. Third, the fiberglass fibers prevent the adhesion of the optical fiber members 12 to the polymer jacket 22 wall.

As best shown in FIG. 2, the fiber reinforcement rod 18 is preferably comprised of multiple end elongated E-type glass roving fibers members 24, elongated multiple end S-type roving fiber members 26, or a combination of both. However, other types of materials may be used as well to replace either the S-type glass fiber members 26 or E-type glass fiber members 24. These include Owens Corning ADVANTEX® glass fibers, E-CR glass, AGY's ZENTRON® high strength fibers, Toyobo ZYLON® high modulus fiber, Du Pont KEVLAR® aramid fibers, Teijen's Twaron aramid fibers, or any other type of high tensile modulus fibers as long as it meets the ultimate tensile strength, crush, impact, and fire resistance of the cable. The elongated glass fibers members 24, 26 are preferably sized with a vinyl ester compatible sizing to prevent fuzzing and add lubricity as is well known in the art.

In an alternative preferred embodiment, a third high strength synthetic strand member 28 of poly (p-phenylene-2, 6-benzobisoxazole), also known as Toyobo's ZYLON®, is added to the reinforcement rod 18. Additionally, high strength aramid strands of poly (p-phenylene terephthalate) strands may also be included. The number and ratio of fibers members 24, 26, and strand members 28 as a function of many factors, including for example tensile strength desired and cost.

The fiber members 24, 26 and strand members 28 are coated with an ultraviolet ("UV") curable vinyl ester resin matrix 30 and subsequently topcoated with a topcoat 32 to form the fiber reinforcement rod 18. Further, as shown in FIG. 1, a polyethylene up jacket 20 preferably is placed around the rod 18 to act as a filler in the cable core assembly to take up excess space and allowing the closest and best packing of the buffer tubes 14 assembled around the rod 18 to prevent optical fiber 12 attenuation within the cabling. The process for forming the fiber reinforcement rod 18 is described below in FIG. 3.

The fiber reinforcement rod 18 has many important functions. First, the rod 18 acts as a carrier and strength member for the optical fiber buffer tubes 14 during cable fabrication. Second, the rod 18 provides tensile strength during installation. Third, the rod 18 provides stiffness and anti-buckling for the cable 10 to prevent optical fiber 12 damage and attenuation of signal.

Referring now to FIG. 3, a process for making the fiber reinforcement rod 18 is depicted. The fiber members 24, 26 and strand members 28 are introduced under tension from a creeling and tensioning mechanism 42 through a series of guide rollers 44 and guide eyelets 45 to a heated resin pumping shower 46 containing the heated UV-curable resin 30. The heating system 48 of the pumping shower 46 is designed to impart higher, more consistent resin 30 temperature control to insure maximum wet out of the fiber members 24, 26 and strand members 28. A series of breaker bars 48 ensure complete wet out of the fiber members 24, 26, and strand members 28. These breaker bars 48 eliminates a primary source of split/delaminated rods by eliminating an opportunity for fuzz accumulation that would eventually catch the strand members 28 and fiber members 24, 26 and plug downstream sizing dies 50. Preferably, the resin 30 is heated to approximately 65-100 degrees Celsius (approximately 150-215 degrees Fahrenheit) during the showering phase.

The coated fiber members 24, 26 and strand members 28 exit the pumping shower 46 and are pulled through a series of sizing dies 50. These sizing dies 50 impart a final resin 30 content as well as forming and giving shape to the a fiber reinforcement rod precursor 18a. The fiber reinforcement rod precursor 18a is then pulled through an ultraviolet light source 51 to cure the resin 30 onto the fiber reinforcement rod 18. The ultraviolet light source 51 may be a microwave UV light source or a mercury vapor UV light source having a range of lamps covering wavelengths from 200 to 380 nanometers to ensure complete cure of the resin 30 to the fibers 24, 26, and strands 28.

Next, a thermoplastic topcoat 32 is applied to the rod precursor 18a in an application box 52 to impart specific bonding characteristics to the rod 18. The topcoat resin 32 is pumped to the box 52 using a hot melt pump or extruder (not shown) at approximately 150-230 degrees Celsius (approximately 300-450 degrees Fahrenheit). The rod 18 containing the topcoat 32 is then pulled through a cooling water bath 54, a rod dryer 56, and a lump catcher 58 designed to impart an even layer of topcoat 32 around the rod 18. A laser diameter checker 60 is preferably added at the end of the line to ensure a uniform coating of resin 30 and topcoat 32. The rod 18 is then pulled through a belt contact pulling mechanism 61 and rolled onto a winding mechanism 62 for later use.

The finished fiber reinforcement rod 18 diameter is preferably between approximately 0.2 and 8.0 mm, depending upon the tensile strength, tensile modulus, cost, adhesion, environmental protection, resistance to surface fiber breakage, and delamination resistance desired. The line speed used to make the rods 18 is dependent upon the rod 18 diameter, with larger diameter rods proceeding more slowly, but is generally between approximately 40-120 meters per minute.

Referring now to FIG. 4, a process is shown for making the optical cable 10 from the reinforcement rod 18 according to one preferred embodiment of the present invention. The fiber reinforcement 18 is pulled from a reel 70 or similar device. The optical fiber 12 and buffer tube 14 are wrapped around the fiber reinforcement rod 18 using buffer tube strander 73 or a similar device well known in the art to form a core assembly 72. An example of the kind of stranding line that may be used to form the core assembly 72 is Nextrom's SZ stranding line OFC 70.

The core assembly 72 is then wrapped with the flexible fiber reinforcing members 16 using a reinforcement server 74 or similar device and are then pulled through a cross head extruder 76, wherein a layer of the polymer jacket 22 is applied at approximately 177 degrees Celsius (350 degrees Fahrenheit) and cooled onto the outer surface of the flexible fiber reinforcing members 16, thereby forming the optical cable 10. The polymer jacket 22 is then cooled by running the optical cable 10 through a water trough 78. The cable 10 is then wound onto a take up reel 80 and is available for use.

FIGS. 5-8 below shows an alternative preferred embodiments of the present invention in which the fiber reinforcement rods 18 are used in a variety of different ways to protect the optical fiber networks.

As seen in FIG. 5, a loose tube cable 100 according to one preferred embodiment has a plurality of optical fiber ribbons 102 contained within a central buffer tube 104. Each ribbon 102 contains a plurality of optical fibers 103. A filling compound 105 is introduced within each buffer tube 104 that functions to both block water ingress into and along each buffer tube 104 and to restrict the movement of the ribbons 102 with the inner space of each buffer tube 104. A layer of water swellable tape 116 surrounds the buffer tube 104. The cable 100 also has a plurality of ripcords 110 located both within and outside of a corrugated steel tape armor 112 that allow easy access to the interior of the cable 100. A polyethylene jacket 114 surrounds the armor 112. A pair of fiber reinforcement rods 18 are contained within the jacket 114 to provide high strength to the cable 100.

Figure 8:
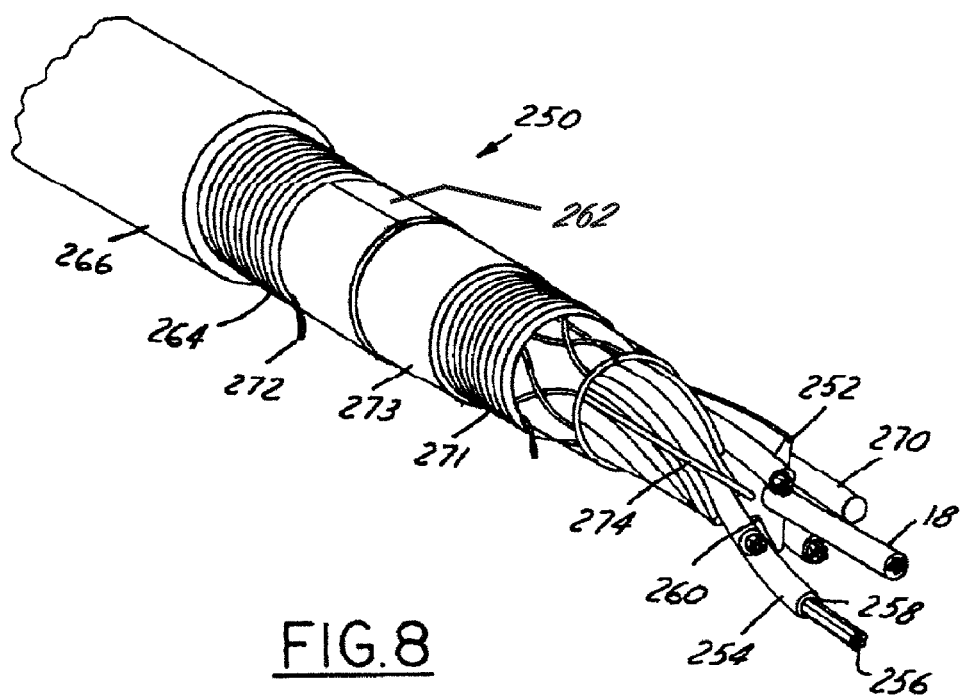
FIG. 8 is a perspective view of another alternative embodiment of the present invention.

As shown in FIG. 6, a figure-8 type cable 150 is shown having the fiber reinforcement rod 18 partially covered with a water swellable yard 154. A plurality of buffer tubes 156 encasing strands of optical fibers 158 substantially surrounds the fiber reinforcement rod 18. A water swellable tape 160 and a plurality of strength members 162 surround the buffer tubes 156 and are encased within a polyethylene jacket 164. Also located within the polyethylene jacket 164 are ripcords 166 that allow easier access to the optical fibers 158. A portion 168 of the polyethylene jacket 164 also encases a plurality of steel messengers 172 that minimize sag during installation.

Referring now to FIG. 7, another preferred embodiment of a cable 200 is shown as having a central core of water swellable yarn 202 surrounded by a plurality of buffer tubes 204 and at least one fiber reinforcement rod 18. Each buffer tube 204 contains at least one optical fiber 206. A filling compound 205 is introduced within each buffer tube 204 that functions to both block water ingress into and along each buffer tube 204 and to restrict the movement of the optical fibers 206 with the inner space of each buffer tube 204. The reinforcement rods 18 and buffer tubes 204 are encased within a water swellable tape 208 and a plurality of secondary strength members 210. The water swellable tape 202 ensures no water ingress along the length of the cable 200. A rugged, durable, medium density polyethylene jacket 216 covers the corrugated steel tape armor 214. A ripcord 212 is placed between the member 212 and a corrugated steel tape armor 214 that allow easy access to the interior of the cable 200 through the jacket 216.

Referring now to FIG. 8, yet another preferred embodiment of a fiberoptic cable 250 is shown in which the fiber reinforcement rod 18 is contained within a slotted polyolefin core 252. A buffer tube 254 containing optical fibers 256 and filler material 258 is contained within corresponding outer slots 260 of the slotted polyolefin core 252. Of course, one or more outer slots 260 may alternatively contain a filler tube 276 without optical fibers. Also contained within these outer slots 260 is at least one strand of water swellable yarn 274 used to prevent water ingress along the length of the cable 250 within the outer slot 260. A layer of inner corrugated steel tape armor 271, an inner layer of a polyethylene jacket 273, a layer of water swellable tape 262, a layer of corrugated steel tape armor 264, and an outer polyethylene jacket 266 all surround the polyolefin core 252 and buffer tubes 254. A ripcord 272 is placed between water swellable tape 262 and a corrugated steel tape armor 264 that allow easy access to the interior of the cable 250 through the jacket 266.

Listed below are examples of fiber reinforcement rods 18 made in accordance with the present invention:

EXAMPLE 1

In one preferred embodiment of the present invention, the input glass used in the reinforcement rods 18 is multiple ends of elongated E-type glass fiber members 24 or multiple ends of elongated S-type glass fiber members 26 having a linear density or tex of approximately 200-400 gm/km. The glass fiber members 24, 26 are sized with a vinyl ester compatible sizing. The glass fiber members 24, 26 are then coated with Vinch 500, an UV curable vinyl ester resin manufactured by Zeon Technologies. The Vinch 500 resin is an UV curable copolymer of novolac vinyl ester (approximately 55% by weight) and 1,6 hexane diol diacrylate (approximately 45% by weight) that is applied between approximately 65 and 100 degrees Celsius. The resin is then cured under UV lighting. The topcoat 32 applied is a polybutylene terepthalate/polyether glycol copolymer topcoat 32 such as HYTREL® G4778, manufactured by E. I Du Pont de Nemours, which is pumped in at approximately 230 degrees Celsius.

Alternatively, the topcoat 32 could be an ethylene acrylic acid co-polymer resin such as Dow's PRIMACOR® 59901 copolymer, which is introduced at approximately 149 degrees Celsius.

EXAMPLE 2

In another preferred embodiment of the present invention, the input glass used in the fiber reinforcement rods 18 is multiple ends of elongated E-type glass fiber members 24 or multiple ends of elongated S-type glass fiber members 26 having a linear density or tex of approximately 200-4000 gm/km. The glass fiber members 24, 25 are sized with a vinyl ester compatible sizing. The glass fiber members 24, 26 are then coated with 17-41B, an UV curable vinyl ester resin manufactured by Zeon Technologies. The 17-41B resin is an UV curable copolymer of novolac vinyl ester (approximately 50% by weight) and dipropylene glycol diacrylate (approximately 50% by weight) that is applied between approximately 65 and 100 degrees Celsius. The resin is then cured under UV lighting. The topcoat 32 applied is a polybutylene terephthalate/polyether glycol copolymer topcoat 32 such as HYTREL® 64778, manufactured by E.I. Du Pont de Nemours, which is pumped in at approximately 230 degrees Celsius.

Alternatively, the topcoat 32 could be an ethylene acrylic acid co-polymer resin such as Dow's PRIMACOR® 59901 copolymer, which is introduced at approximately 149 degrees Celsius (300 degrees Fahrenheit).

The present invention offers many improvements over traditional reinforcement rods and optical fiber cables. First the resin system and/or the fiber composition of the fiber reinforcement rods 18 offers improved tensile strength, tensile moduli, adhesion, environmental protection, resistance to surface fiber breakage, and delamination compared to traditional rods used. Further, the present invention improves the processing of the optical fiber cable 10 to permit higher translation of strain energy due to reduced defects and residual stresses to allow tougher more resilient cured fiber reinforcement rods 18. Also, the present invention reduces waste and increase line efficiency during manufacture to reduce costs.

While the invention has been described in terms of preferred embodiments, it will be understood, of course, that the invention is not limited thereto since modifications may be made by those skilled in the art, particularly in light of the foregoing teachings.

What is claimed is:

1. A reinforcement rod for optical cables comprising:
a compact fiber reinforced rod comprising:
   a plurality of elongated fiber members encased in a matrix of a UV cured vinyl ester resin material; and
   an outer topcoat layer substantially surrounding said matrix, said outer topcoat layer being a separate layer distinct from the matrix and including a thermoplastic hot melt ethylene acrylic acid polymer resin having a different composition than the matrix and formulated to impart specific bonding characteristics to said rod;
   wherein said UV cured vinyl ester resin material is heated to within a range of from about 65° C. to about 100° C. when applied to said plurality of elongated fibers to encase in said matrix; and
   wherein said ethylene acrylic acid polymer resin is heated to within a temperature range of from about 150° C. to about 230° C. when applied to said matrix to form said outer topcoat layer; and
wherein said elongated fiber members include one or more of E glass fiber members and one or more of S glass fiber members and one or more of high strength synthetic strands of poly (p-phenylene-2.6-benzobisoxazole) fiber members and one or more of high strength aramid strands and one or more of polyphenylene terephthalate strand members.

2. The reinforcement rod of claim 1 wherein said compact fiber reinforced rod includes an upjacket substantially surrounding said outer topcoat layer.

3. The reinforcement rod of claim 1 wherein said UV cured vinyl ester resin material is selected from the group consisting of novolac vinyl ester and 1, 6 hexane diol diacrylate copolymer material, and novolac vinyl ester and dipropylene glycol diacrylate copolymer material.

4. The reinforcement rod of claim 1 includes an upjacket substantially surrounding said reinforcement rod.

* * * * *